Feb. 11, 1969  L. G. McCAIN  3,427,103
SHUTTER RELEASE DEVICE FOR MOVING PICTURE CAMERAS
Filed Sept. 14, 1966

LAWRENCE C. McCAIN
INVENTOR.

BY Lyon Lyon
ATTORNEYS

United States Patent Office 3,427,103
Patented Feb. 11, 1969

3,427,103
SHUTTER RELEASE DEVICE FOR MOVING
PICTURE CAMERAS
Lawrence G. McCain, Beverly Hills, Calif., assignor to
Ponder & Best, Los Angeles, Calif., a partnership
Filed Sept. 14, 1966, Ser. No. 579,316
U.S. Cl. 352—178    4 Claims
Int. Cl. G03b 1/00, 19/18

This invention relates to shutter release devices for moving picture cameras, and included in the objects of this invention are:

First, to provide a shutter release device which is particularly adapted for use on small moving picture cameras of the type having a hand grip extending below the camera body, the shutter release device being located at the juncture of the hand grip and camera body so as to be readily engaged by the user's forefinger.

Second, to provide a shutter release device which includes a novelly arranged trigger so arranged that the trigger also serves as a guard to prevent accidental operation of the camera.

Third, to provide a shutter release device of this type wherein the trigger may be quickly flipped from its guard position to its operating position, or as quickly returned to its guard position so that delay in operating the camera is minimal.

Fourth, to provide a shutter release device which does not interfere with use of an auxiliary cable connected shutter release, should such auxiliary device be desired.

With the above and other objects in view, as may appear hereinafter, reference is directed to the accompanying drawings in which.

Figure 1:
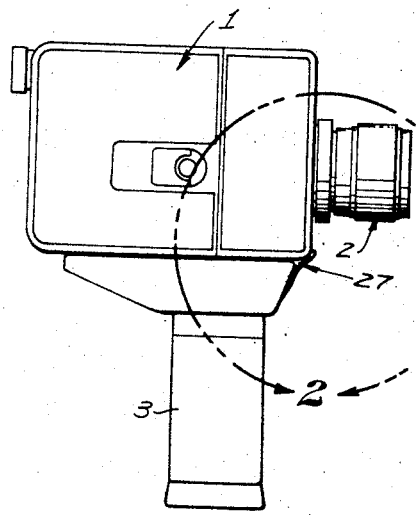
FIGURE 1 is a reduced side view of a moving picture camera, incorporating the invention.

A typical moving picture camera, for which the shutter release device is adapted, includes a camera body 1, from the forward end of which extends a lens assembly 2, and from the underside of which extends a hand grip 3, located adjacent the forward end of the camera body.

Contained within the camera body is a shutter 4, mounted on a shaft 5. Also mounted on the shaft 5 is a cam 6, having a shoulder 7. Also located within the camera body is a switch 8. These elements are conventional and are shown essentially diagrammatically in FIGURES 2 and 3.

An operating lever 9 is contained within the camera body and is pivotally supported by a fulcrum pin 10. The lever 9 includes an upwardly extending cam engaging arm 11, a rearwardly extending switch engaging arm 12, and a downwardly and forwardly curving release arm 13. For the purposes of this application, the lever 9 may be considered as conventional.

The lower forward corner of the camera body 1 is provided with a forwardly opening access cavity 14, defined by side walls 15, an upper wall 16, and a lower wall 17. The upper portion of the hand grip 3 may have a clearance notch 18 therein, extending downward from the lower wall 17.

The access cavity 14 receives an inner trigger 19, which is channel shaped in cross section, and includes side flanges 20, confronting the side walls 15, and a connecting web 21 located inwardly from the forward extremity of the access cavity 14. The connecting web 21 confronts the release arm 13 of the lever 9. The upper portions of the side flanges 20 are provided with rearwardly directed extensions 22, which receive a pivot pin 23, extending between the side walls 15.

The lower portion of the connecting web 21 is provided with a notch 24, and attached to the web, so as to project into the notch 24, is a small leaf spring 25. The web 21 forms shoulders 26 at either side of the notch 24.

An outer trigger 27 is provided, one end of which is joined to the lower portions of the side flanges 20, by a pivot pin 28. The outer trigger is dimensioned to fit between the side flanges 20 and is generally arcuate in form, with an offset tip 29. The outer trigger moves between an upwardly directed guard position, shown in solid lines in FIGURE 2, and a lower or operating position, shown by broken lines in FIGURE 2, and also by solid lines in FIGURE 3. The outer trigger includes a finger engaging side 30, which is exposed when the outer trigger is directed downward, and a guard side 31, which is exposed when the outer trigger is directed upwardly. The offset tip 29 extends into a recess 32, formed in the outer portion of the upper wall 16, and is limited by the walls of the recess against movement into the camera body.

Figure 2:
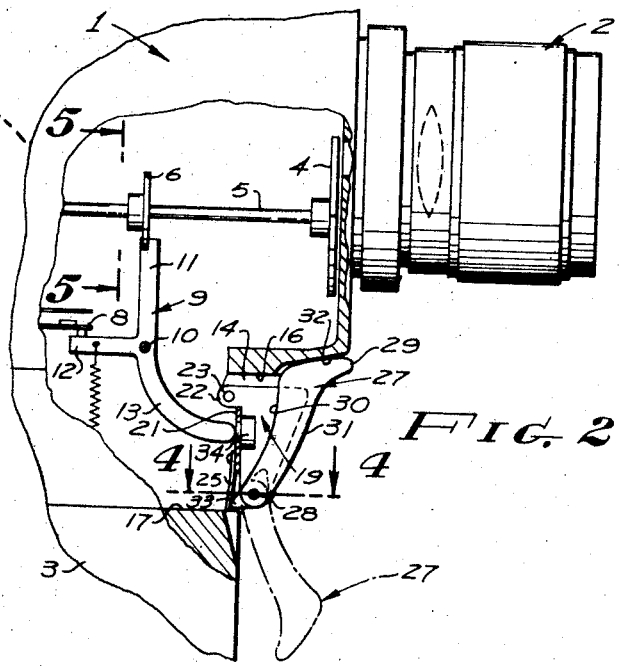
FIGURE 2 is an enlarged fragmentary view, partially in elevation and partially in section, taken within circle 2 of FIGURE 1, showing the shutter release device in position to prevent operation of the camera.
Figure 4:
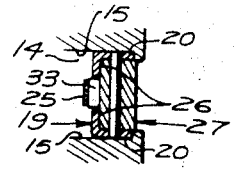
FIGURE 4 is a fragmentary sectional view, taken through 4—4 of FIGURE 2.
Figure 3:
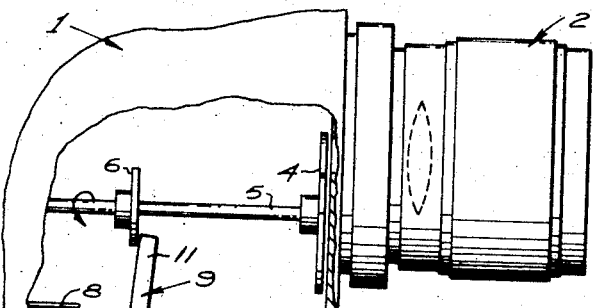
FIGURE 3 is a similar fragmentary, partial elevational, partial sectional view, showing the shutter release device in its operative position.
Figure 6:
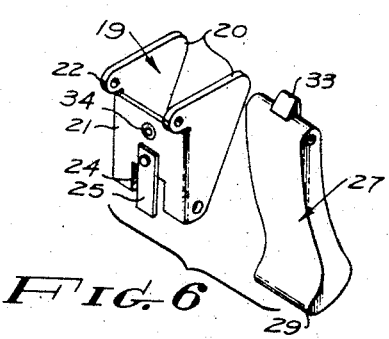
FIGURE 6 is a perspective view of the inner and the outer triggers.
Figure 5:
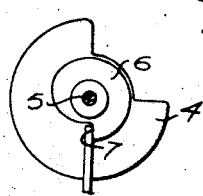
FIGURE 5 is a fragmentary sectional view, taken through 5—5 of FIGURE 2.

The lower extremity of the outer trigger 27 is provided with a cam lug 33 which extends into the notch 24 and is engaged by the spring 25 when the outer trigger is in its upper or guard position, shown in FIGURE 2, so that the outer trigger is yieldably retained in this position. The extremity of the offset tip 29 projects a slight distance forward of the camera body so that it may be engaged to pivot the outer trigger from the position shown in FIGURE 2 to the position shown in FIGURE 3. It will be noted also that when the outer trigger 27 is in its guard position, it is located within the side walls 15, except for the extremity of the offset tip 29, so that it is not readily engaged accidentally.

Mounted on the connecting web 21, and clearing the outer trigger 27, is a cable control attachment fitting 34. This fitting is in itself is conventional and is provided with internal screwthreads to which a conventional cable control attachment may be fastened, so that the cable control attachment may be employed to engage the release arm 13 of the lever 9.

Operation of the shutter release device is as follows:

When the camera is not in use, the outer trigger 27 is maintained in its guard position, shown in FIGURE 2. When it is desired to use the camera, the outer trigger is quickly flipped from the solid line position, shown in FIGURE 2, to the broken line position in FIGURE 2, placing the outer trigger in position for pivoting the inner trigger 19. When the outer trigger is pressed rearwardly, to the position shown in FIGURE 3, the release arm 13 is engaged so that the lever 9 disengages the cam 6, permitting rotation of the shaft 5 and shutter 4, and closes the switch 8, connected to the motor which drives the shaft 5. When it's desired to inactivate the camera, the outer trigger 27 is flipped to the solid line position shown in FIGURE 2.

While a particular embodiment of this invention has been shown and described, it is not intended to limit the same to the details of the construction set forth, but instead, the invention embraces such changes, modifications

I claim:
1. The combination with a moving picture camera having walls defining an access recess and a lever movable to control the camera shutter and to close a switch, the operating end of said lever being positioned in registry with said access recess, of means for operating said lever, comprising:
 (a) an inner trigger pivotally mounted between said walls within said recess for engagement with said lever;
 (b) an outer trigger pivotally connected to said inner trigger and movable between a guard position between said walls within said recess and overlying said inner trigger and an extended operating position in essentially radial relation with the pivotal axis of said inner trigger and projecting laterally from said recess.
2. A means, as defined in claim 1, wherein:
 (a) means yieldably retains said outer trigger member in its guard position.
3. A means, as defined in claim 1, wherein:
 (a) said inner trigger is channel shaped and pivoted at its upper extremity inwardly from the outer extremities of said walls;
 (b) said outer trigger when in its guard position fitting within said inner trigger and dimensioned to close said recess with its outer surface essentially flush with the margins of said recess.
4. A means, as defined in claim 3, wherein:
 (a) a cable attachment fitting is mounted on said inner trigger for access when said outer trigger is in its operating position.

References Cited
UNITED STATES PATENTS
2,275,644  3/1942  Olmstead _____ 352—178

FOREIGN PATENTS
1,074,973  2/1960  Germany.

JULIA E. COINER, *Primary Examiner.*

U.S. Cl. X.R.
352—95